United States Patent
Kobayashi et al.

(10) Patent No.: US 6,212,516 B1
(45) Date of Patent: Apr. 3, 2001

(54) PARALLEL DATABASE MANAGEMENT METHOD AND PARALLEL DATABASE MANAGEMENT SYSTEM

(75) Inventors: Susumu Kobayashi, Kawasaki; Yoichi Yamamoto, Sagamihara; Masashi Tsuchida, Machida; Yukio Nakano, Oyama; Norihiro Hara, Kawasaki; Yoshito Kamegi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/429,440

(22) Filed: Oct. 28, 1999

Related U.S. Application Data

(63) Continuation of application No. 09/025,245, filed on Feb. 18, 1998, now Pat. No. 5,983,228.

(30) Foreign Application Priority Data

Feb. 19, 1997 (JP) .................................... 9-035021

(51) Int. Cl.$^7$ .............................. G06F 17/30; G06F 3/14
(52) U.S. Cl. .................................... 707/3; 707/8; 707/10; 345/333
(58) Field of Search ................... 707/1–10, 100–104, 707/200–206; 700/2; 709/107; 710/20

(56) References Cited

U.S. PATENT DOCUMENTS

| | | | |
|---|---|---|---|
| 4,751,635 | * 6/1988 | Kret | 707/10 |
| 5,566,349 | * 10/1996 | Trout | 710/20 |
| 5,636,376 | 6/1997 | Chang | 395/704 |
| 5,675,798 | 10/1997 | Chang | 709/224 |
| 5,813,005 | 9/1998 | Tsuchida et al. | 707/10 |
| 5,884,327 | 3/1999 | Cotner et al. | 707/202 |
| 5,940,289 | * 8/1999 | Iwata et al. | 700/2 |
| 5,968,115 | * 10/1999 | Trout | 709/107 |

FOREIGN PATENT DOCUMENTS 8137910   5/1996 (JP) .

OTHER PUBLICATIONS

ISO/IEC JTC1/SC21 N10489 Information Technology–Database Languages–SQI–Part 2: SQL/Foundation.
Japanese Translation of Object Relational DBMSs by Michael Stonebraker, translated by Y. Ohta, Aug. 1996.
Japanese Translation of "The Common Object Request Broker: Architecture and Specification", OMG Document No. 91.12.1, Revision 1.1, 10/92.

* cited by examiner

*Primary Examiner*—Ruay Lian Ho
(74) *Attorney, Agent, or Firm*—Antonelli, Terry, Stout & Kraus, LLP

(57) ABSTRACT

In a database management system including a request reception server and a plurality of execution servers, each having a plug-in program module incorporated by a user, the request reception server analyzes a processing request from the user to determine whether or not the plurality of execution servers require currently unidentified input parameters when executing external functions in their plug-in modules, based on a definition information table created from descriptions of interface specifications for the plug-in program modules. When it is determined that the execution servers require such input parameters, an external function in the plug-in program module in the request reception server is executed to previously acquire the unidentified input parameters. The request reception server creates an execution processing procedure code, to be executed by the plurality of execution servers, assuming that the unidentified input parameters have already been inputted, and passes the execution processing procedure code together with the input parameters acquired by the request reception server to the plurality of execution servers.

8 Claims, 9 Drawing Sheets

EXAMPLE OF PLUG-IN MODULE
SPECIFICATION DESCRIPTION

<u>386</u> p_sgml_extract ( in       sgmltext_t, ~602 in       VARCHAR, ~603 returns BLOB, ~604 in       BLOB setter('p_sgml_load_sgmldef') ~605

) as ADT_FUNCTION; ~606 p_sgml_load_sgmldef ( returns BLOB, ~607 in       DBCOLUMNINFO ~608

) as BIND_PARAMETER; ~609

FIG.7A

USER DEFINED FUNCTION INFORMATION 701

ADT FUNCTION-EXTERNAL FUNCTION TABLE

| ADT FUNC-TION NAME | ADT TYPE NAME | EXTERNAL FUNCTION NAME |
|---|---|---|
| extract | sgmltext_t | p_sgml_extract |

ADT FUNCTION PARAMETER TABLE 702

| ADT FUNC-TION NAME | PARAMETER NUMBER | PARAMETER TYPE |
|---|---|---|
| extract | 1 | sgmltext_t |
| extract | 2 | VARCHAR |

FIG.7B

PLUG-IN MODULE DEFINITION INFORMATION

EXTERNAL FUNCTION TABLE 706

| EXTERNAL FUNCTION NAME | FUNCTION QUALIFICATION |
|---|---|
| p_sgml_extract | ADT FUNCTION SUPPORTABLE |
| p_sgml_load_sgmldef | PARAMETER BIND |

EXTERNAL FUNCTION PARAMETER TABLE 707

| EXTERNAL FUNCTION NAME | PARAMETER NUMBER | PARAMETER TYPE | PARAMETER MODIFICATION |
|---|---|---|---|
| p_sgml_extract | 1 | sgmltext_t | — |
| p_sgml_extract | 2 | VARCHAR | — |
| p_sgml_extract | 3 | BLOB | RETURN |
| p_sgml_extract | 4 | BLOB | PARAMETER BIND 'p_sgml_load_sgmldef' |
| p_sgml_load_sgmldef | 1 | BLOB | RETURN |
| p_sgml_load_sgmldef | 2 | DBCOLUMNINFO | — |

PARALLEL DATABASE MANAGEMENT METHOD AND PARALLEL DATABASE MANAGEMENT SYSTEM

CROSS-REFERENCE TO RELATED APPLICATIONS

This is a continuation of application Ser. No. 09/025,245, filed Feb. 18, 1998. U.S. Pat. No. 5,983,228.

This invention is related to U.S. application Ser. No. 08/558,189 filed Nov. 15, 1995, and U.S. application Ser. No. 08/917,711 entitled "DATABASE PROCESSING METHOD" filed Aug. 26, 1997, the contents of which are incorporated herein by reference.

BACKGROUND OF THE INVENTION

The present invention relates to database management techniques, and more particularly to a database management system which is applicable to a parallel database management system having a function of executing a program module incorporated therein by a user.

The present invention utilizes the following three known techniques related to a database management system (hereinafter abbreviated as "DBMS") for managing a database (hereinafter abbreviated as "DB"):

(1) Parallel DB Processing;
(2) SQL3; and
(3) Object Relational DBMS.

In the following, these three known techniques will be briefly described.

(1) Parallel DB Processing

This is a method of parallelly executing database processing which satisfies a user's request using a plurality of processors for processing user's queries involving a large amount of data. An example of this method is described in JP-A-8-137910 (Reference 1). In the method of Reference 1, a processor receives a user's query, and a DBMS controls the executions of a plurality of engine processors (execution servers) such that a load is optimally distributed among the engine processors.

(2) SQL3

SQL3 is a draft of a database language specification for which the International Standard Organization (ISO) is currently working for standardization. For example, according to "Information technology—Database languages—SQL—Part 2: SQL/Foundation" ISO/IEC JTC1/SC21 N10489 (Reference 2), SQL3 permits a description as follows:

```
CREATE TYPE sgmltext_t (
    text BLOB,                              ... ①
    FUNCTION extract (sgmltext─t,
    VARCHAR)                                ... ②
    RETURNS BLOB
    LANGUAGE C
    EXTERNAL NAME 'p_sgml_extract';         ... ③
);
```

This description provides definition statements for an abstract data type (hereinafter abbreviated as "ADT"). ① in the definition statements indicates that ADT sgmltext_t is composed of a component of BLOB (Binary Large Object) type referenced by a name "text."

Also, ② in the definition statements indicates that an ADT function extract( ) can be applied to data having an ADT sgmltext_t type.

Further, ③ in the definition statements indicates that the ADT function extract( ) is related to an external function labelled p_sgml_extract described in C language.

The user can define his inherent data type using the ADT as described above, thereby realizing functions corresponding to data access, inheritance and so on by methods in a general object-oriented program language.

(3) Object Relational DBMS

They say that a conventional relational DBMS (hereinafter abbreviated as "RDBMS") based on a relational data model is not suitable for handling data having a complicated structure such as multimedia data because it cannot provide close representations of such data and also implies other problems on performance. For this reason, an object relational DBMS (hereinafter abbreviated as "ORDBMS"), which introduces an object orientated concept into RDBMS, has been proposed as described in "Object Relational DBMSs" written by Michael Stonebraker, translated by Yoshinobu Ohta, and published by International Thompson Publishing Japan, August 1996 (Reference 3). Reference 3 mentions as a basic requirement of ORDBMS that ORDBMS should be capable of handling complicated objects. Reference 3 also mentions that the ORDBMS should be able to use the following user defined types and user defined functions:

```
create type phone_t (
    area          varchar(3),      ... ④
    number        varchar(7),      ... ⑤
    description   varchar(20));    ... ⑥
```

This description provides definition statements for a user defined complex type phonhd ─t. The definition statements indicate that the complex type phone_t is composed of three components: a variable character string type element of three bytes or less referenced by a name "area" (④ in the definition statements); a variable character string type element of seven bytes or less referenced by a name "numbers" (⑤ in the definition statements); and a variable character string type element of 20 bytes or less referenced by a name "description" (⑥ in the definition statements).

An example of definition statements for a user defined function is shown in the following:

```
create function Northness-equal (point, point) returns Boolean
    with selfunc=selectivity_comp external name '/usr/Northness_
    equal' language C;                                            ⑦
```

This description provides definition statements for a user defined function Northness_equal( ). ⑦ in the definition statements indicates that the user defined function Northness_equal( ) is associated with an external function labelled /usr/Northness_equal described in C language. As to an external function, Reference 3 describes that good ORDBMS should be able to dynamically link a user defined function so as not to consume an address space of DBMS for nothing until the user defined function is required. Such user defined type and user defined function can be used in correspondence to ADT and ADT function described by SQL3, respectively.

The present inventors have found the following problems as a result of investigating DB systems utilizing the known techniques described above.

First, a conceptual diagram representing an exemplary configuration of a conventional DB system is illustrated in FIG. 1. The illustrated DB system 100 is a system for managing documents described in SGML (Standard Generalized Markup Language). A DBMS 120 for managing the DB system 100 comprises a request reception server 130 for receiving a query 104 from a user; a plurality of execution servers 140-1–140-n for executing database processing in accordance with instructions from the request reception server 130; and a single dictionary server 160 for managing definition information of the system 100, and the DBMS 120 is adapted to control general parallel DB processing. These servers are interconnected through a communication path 180.

Assume that a definition for management of SGML document, subjected to DB processing by the DBMS 120, is described by SQL3 in the following manner:

```
CREATE TYPE sgmltext_t (
    text BLOB,                                      ... ⑧
    FUNCTION extract ( sgmltext_t,
        VARCHAR)                                    ... ⑨
    RETURN BLOB
    LANGUAGE C
    EXTERNAL NAME 'p_sgml_extract';                 ... ⑩
);
CREATE TABLE reports (
    published_date      DATE,
    contents            sgmltext_t);                ... ⑪
```

The user of this DB system 100 will issue a desired query for data in a DB described in SGML (hereinafter abbreviated as "SGML text"), using the ADT sgmltext_t type.

⑧ in the description statements indicates that the ADT sgmltext_t type has text of BLOB type as a component.

⑪ in the description statements represents the structure of data corresponding to report in the user's DB model using a table reports. More specifically, in correspondence to the "report" comprising "published date" and "reported contents" as its components, the table reports is defined to comprise a DATE type column published_date and an ADT sgmltext_t type column contents.

For processing a large amount of SGML documents in parallel, a record 152-1 in the table reports and a SGML text 154-1 are held in storage devices 150-1–150-n respectively accessed by the execution servers 140-1–140-n. For rapidly searching for "report" with a condition defined by "published date," a column published—date of the table reports is indexed using a general indexing function provided by the execution servers.

⑨-⑩ in the description statements define an ADT function extract( ) which is a function for extracting text data delimited by tags (156, 158 in FIG. 1) from the SGML text 154-1, and requires the following two input parameters:

(1) Original SGML text from which text data is extracted; and (2) a tag name for specifying a portion to be extracted.

⑩ in the description statements is an external function p_sgml_extract( ) which is defined as a function for realizing an ADT function extract( ). An object code 144-1 for realizing the external function p_sgml_extract( ) is included in a plug-in program module (hereinafter a "plug-in module") 142-1. The plug-in module 142-1 is a program module incorporated in the execution server for realizing a SGML document data management function of the DB system 100.

In this example, control information based on document structure information on SGML documents is used for performing partial extraction of the SGML text 154-1 delimited by specified tags 156, 158. This control information includes structural information for structuring a partially extracted data as a SGML document, and is indispensable information for creating an extraction result. The control information for the partial extraction processing is called "extraction parameters." The extraction parameters are based on the SGML document structure, and are commonly utilized for SGML texts having the same SGML document structure. In this DB system 100, the extraction parameters are collectively managed in the system by the dictionary server 160.

The dictionary server 160 holds the extraction parameters 172 in an associated storage device 170. The structure of SGML documents in the DB is permanently represented by a column for holding a SGML text such that the format or document structure of the "reported contents" in the "reports" is fixed. Accordingly, the extraction parameters are also permanently represented by a column for holding a SGML text to be processed. Thus, the dictionary server 160 manages the extraction parameter 172 on the basis of table names and column names so that each of the execution servers 140-1–140-n can acquire the extraction parameters 172.

With the configuration described above, the partial extraction processing is executed for the SGML text in accordance with the following procedure.

(1) Based on the table name and the column name of a column in a table which holds a target SGML text to be handled, an access to the dictionary server 160 to acquire extraction parameters is carried out on an execution server.

(2) The partial extraction processing utilizing the extraction parameters acquired in step (1) is carried out on an execution server. The execution of steps (1), (2) in this procedure is controlled by a plug-in module 144-1.

Next, description will be made on a search operation on the DB system 100 including the partial extraction processing of a SGML text.

For example, a search request from the user requesting to "extract abstracts of reports, the published date of which is later than Oct. 15, 1996" may be described by SQL3 in the following manner.

SELECT extract(contents, 'abstract')
FROM reports
WHERE published—date>'1996-10-15'

Database processing appropriate to this search request is executed in the following procedure:

(1) A set of records in reports satisfying the conditions defined by the WHERE phrase are acquired using an index set to the column published_date in the table reports.

(2) Based on the set of records acquired in step (1), SGML texts are sequentially retrieved from the contents of records in reports. Then, an external function p_sgml_extract( ) for realizing the ADT function extract( ) is called to extract abstracts.

In this procedure, the processing at step (2) for sequentially retrieving SGML texts to extract the abstracts is executed by each of the execution servers in consideration of efficient utilization of the parallel processing function for faster processing, and a reduction in the amount of data transferred to the request reception server for making up a search result.

Each execution server calls the external function p_sgml_extract( ) for partially extracting abstracts, and passes the execution control to the plug-in module 144-1. The plug-in module 144-1, to which the execution control has been passed, accesses the dictionary server 160 to acquire the extraction parameters 172, and executes the extraction processing utilizing the extraction parameters 172.

The system illustrated in FIG. 1, however, implies the following problems.

In the database processing for the foregoing search, all of plug-in modules on a plurality of execution servers 140-1, 140-2, . . . , 140-n, running in parallel, make an access to the single dictionary server 160, so that the processing for retrieving the extraction parameters 172 is intensively executed in the dictionary server 160.

In the conventional processing scheme illustrated in FIG. 1, the parallel processing for distributing a load adversely affects with respect to the access to the dictionary server 160. Specifically, as the number of execution servers is larger, the dictionary server 160 suffers from a larger load, and consequently, the search processing capabilities of the entire system are degraded due to a limited performance of the dictionary server 160.

Also, for sequentially extracting records satisfying the condition defined by the WHERE phrase, as in the aforementioned query statements, the dictionary server 160 is burdened with a load larger than the actual number of execution servers.

To solve the problem mentioned above, the following method is taken into account.

The scheme illustrated in FIG. 1 causes the problem because plug-in modules are executed on a plurality of execution servers 140-1, 140-2, . . . , 140-3 so that the single dictionary server 160 is intensively accessed by these plug-in modules.

The plug-in modules on the plurality of execution servers individually access the dictionary server 160 because they intend to acquire the extraction parameters 172 required for the extraction processing. However, the extraction parameters 172 required during the processing for the query are the same in either of the execution servers. In addition, the extraction parameters 172 need not be acquired by directly accessing the dictionary server 160 from their execution environments on the respective execution servers. Therefore, if all the execution servers are allowed to reference the extraction parameters 172 acquired from the dictionary server 160 by any means, the execution servers can individually execute the extraction processing without accessing the dictionary server 160.

To realize the concept mentioned above, the present inventors have devised a method processed by a procedure as illustrated in FIG. 2. This procedure will be described below.

(STEP 1) A request reception server 230 acquires extraction parameters 272 from a dictionary server 260. An external function 234 for acquiring the extraction parameters 272 from the dictionary server 260 is provided by a plug-in program module 232, and the request reception server 230 calls the external function 234.

(STEP 2) The request reception server 230 transmits the extraction parameters 272 together with an execution instruction to respective execution servers 240-1, 240-2, . . . , 240-n.

(STEP 3) An external function 244-1 for executing extraction processing on each execution server (e.g., 240-1) executes the extraction processing with reference to the extraction parameters 272 transmitted thereto from the request reception server 230. The external function for executing the extraction processing using the extraction parameters 272 as input parameters is provided by a plug-in module 242-1. The execution server 240-1 passes the extraction parameters 272 transmitted from the request reception server 230 as input parameters for the external function 244-1, when it calls the external function 244-1.

However, the aforementioned three known techniques cannot control the execution of the plug-in modules 232, 242-1 in accordance with the procedure described above, if they are used without any modifications.

It is further desirable that the user can specify the control for the execution of plug-in modules as mentioned above. Thus, the inventors directed their attention to a method of utilizing an interface definition language (IDL) which is described in "The Common Object Request Broker: Architecture and Specification" OMG Document Number 91.12.1, Revision 1.1 (Reference 4) as a prior art technique related to the specification of a function definition.

This method defines an interface between modules with the IDL in a software architecture called "CORBA." The interface is associated with a programming language such as C language or the like, and a module for connection called "stub" is produced. A flexible inter-module communication is enabled through this stub module. However, the specifications of the IDL described in Reference 4 do not permit the user to directly specify to control the execution of external functions as mentioned above. The inventors added modifications to the specifications of the IDL to permit the user to directly specify to control the execution of external functions as mentioned above.

SUMMARY OF THE INVENTION

It is therefore a first object of the present invention to provide a database management method and a parallel database management system which are capable of eliminating the problems described above to improve the system performance.

It is a second object of the present invention to provide a database management method which permits the user to directly specify to perform an execution control for plug-in modules.

To achieve the above objects, the present invention provides a parallel database management system including a request reception server for receiving a request from a user, and a plurality of execution servers for parallelly executing database processing appropriate to the request from the user in accordance with instructions of the request reception server, wherein the request reception server and the execution servers have a function of executing a plug-in module incorporated in a database system by the user. The parallel database management system may comprise:

means for causing the request reception server to recognize that information to be passed to the plug-in modules as an input, when the plug-in modules are executed on the execution servers, is acquired by executing another plug-in module on the request reception server, when the request reception server creates an execution procedure code for instructing an execution procedure for the database processing appropriate to the request from the user;

means for executing the plug-in module on the request reception server in accordance with the recognition to acquire the information to be passed as an input; and means for causing the request reception server to edit the execution procedure code so as to pass the acquired information as an input when the plug-in modules are executed on the execution servers.

The present invention also provide a database management system which has a function of creating control information for the database management system to call a function of a plug-in module based on a description of an interface specification for the plug-in module, wherein the description of the interface specification for the plug-in module includes:

an instruction for adding an input, which is not included in a combination of inputs defined in an interface for calling a function of a plug-in module in response to a request from the user, to a combination of inputs defined in an interface for the database management system to call a function of a plug-in module; and an instruction for acquiring information to be passed to the plug-in modules as an input when the plug-in modules are executed on the execution servers, by executing another plug-in module on the request reception server, and the database management system may comprise means for controlling the execution of the database including the execution of the plug-in module in accordance with the instructions included in the description.

BRIEF DESCRIPTION OF THE DRAWINGS

FIGS. 7A and 7B are tables showing examples of user defined function information and plug-in module definition information used in the embodiment of the present invention;

DESCRIPTION OF THE PREFERRED EMBODIMENTS

An embodiment of the present invention will hereinafter be described in detail with reference to the accompanying drawings.

Figure 3:
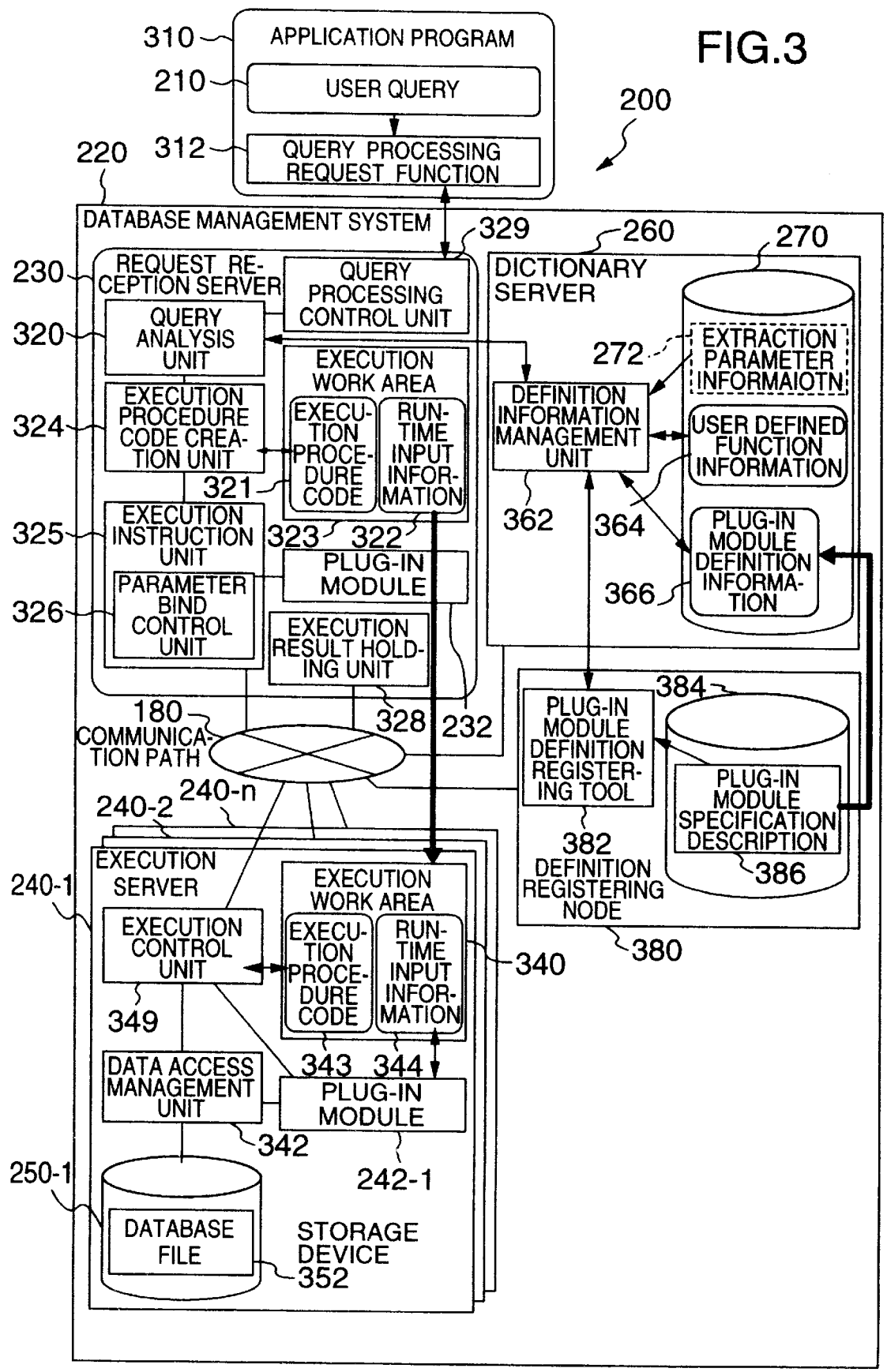
FIG. 3 is a schematic diagram illustrating a function in the embodiment of the present invention shown in FIG. 2.

FIG. 3 is a block diagram of a DB system 200 which embodies the present invention, viewed from a functional aspect. The DB system 200 is generally composed of an application program (hereinafter abbreviated as the "AP") 310 for transmitting a user's request to a DB file 352, and a database management system (hereinafter abbreviated as the "DBMS") 220 for processing a request from the AP 310. The AP 310 is created in the following procedure as is done in an ordinary DB system operation, though not shown.

(1) The user describes a query statement using a database language (SQL3 in this example).

(2) A source code of a program for requesting query processing is generated using an AP creation tool provided by the DBMS with the description of step (1) used as an input.

(3) The source code created at step (2) is compiled by any suitable programming language to generate an object code.

The AP 310 calls a query processing request function 312 provided by the DBMS 220. When the query processing request function 312 is called, a user query 210 is used as an input parameter. The query request function 312 called by the AP 310 transmits the user's query 210 to a query processing control unit 329 in a query reception server 230.

The DBMS 220 comprises the request reception server 230 for receiving a query processing request from the AP 310; a plurality of execution servers 240-1, 240-2, . . . , 240-n for parallelly executing database processing which satisfy a request from the user; a single dictionary server 260 for managing system definition information; and a plug-in module definition registering server 380 including a plug-in module definition registering tool 382 for creating plug-in module definition information 366 from a plug-in module specification description 386 and registering the created information 366 in the dictionary server 260. These servers are interconnected through a communication path 180.

The DBMS 220 controls general parallel DB processing. The request reception server 230 comprises a query processing control unit 329 for receiving a request from the AP 310 and controlling the execution of processing appropriate to the request; a query analysis unit 320 for analyzing the received query processing request; an execution procedure code creation unit 324 for creating, based on the analysis result of the query analysis unit 320, an execution procedure code 321 indicative of a procedure for DB processing appropriate to a user's request, and run-time input information 322 which is passed to the execution servers 240-1, 240-2, . . . , 240-n as input parameter information when they execute the processing, in an execution work area 323; and an execution instruction unit 325 for instructing the execution servers 240-1, 240-2, . . . , 240-n to execute associated DB processing based on the execution procedure code 321 and the run-time input information 322 which is an input parameter required upon execution.

The execution instruction unit 325 includes a parameter bind control unit 326 for controlling the processing of the request reception server 230 for executing a plug-in module 232 to acquire the run-time input information 322 prior to the executions by the execution servers. Here, the determination of the input parameter 322 made by the request reception server 230 executing the plug-in module 232 under the control of the parameter bind control unit 326 is called the "parameter bind." The plug-in module 232 in the request reception server 230 holds an object code for executing the parameter bind. The request reception server 230 also comprises an execution result holding unit 328 for holding a processing result returned from the execution servers 240-1, 240-2, . . . , 240-n in response to an instruction from the execution instruction unit 325.

The execution server 240-1, representing 240-1, 240-2, . . . , 240-n, comprises an execution control unit 349 coupled to receive an instruction from the execution instruction unit 325 of the request reception server 230 through the communication path (network) 180 for conducting a control to execute processing in accordance with the received instruction; an execution work area 340 for holding the contents of the execution work area 323 transmitted from the execution instruction unit 325 of the request reception server 230 as they are; and a data access management unit 342 for managing the handling of data inputted to and outputted from a database file 352 for holding DB data as well as for managing data on the execution server 240-1. The execution work area 340 holds an execution procedure code 343 indicative of a processing procedure in the execution server 240-1, and the run-time input information 344 which is input parameter information used when processing is executed in accordance with the execution procedure code 343. The execution server 240-1 also comprises a plug-in module 242 which includes an external function executed in the execution server 240-1. The execution server 240-1 stores the database file 352 in a storage device 250-1. Each of the remaining execution servers 240-2–240-n has substantially the same configuration as the execution server 240-1.

The dictionary server 260 comprises a definition information management unit 362 for managing definition information related to the DB system 200. The dictionary server 260 stores the definition information together with extraction parameter information 272 in a storage device 270. The extaction parameter information 272 is shown by doted lines in FIG. 3 only as an example of input information which the request reception server 230 receives in the embodiment of the invention. Thus, it is noted that the input information which the request reception server 230 receives is not limited only to information stored in the dictionary server 260. The definition information managed by the definition information management unit 362 is classified into user defined function information 364 and plug-in module definition information 366.

In this system configuration 200, a user's query 210 is processed in accordance with a procedure wherein the request reception server 230 receives a request from the AP 310, the request reception server 230 instructs processing appropriate to the request to the execution servers 240-1, 240-2, . . . , 240-n, the request reception server 230 receives a processing result from the execution servers 240-1, 240-2, . . . , 240-n, and the execution result holding unit 328 holds the processing result. The acquisition of the result for the user's query is executed in accordance with a procedure wherein the AP 310 transmits a request for retrieving the result to the request reception server 230, and the request reception server 230 returns the execution result held in the execution result holding unit 328 in response to the request from the AP 310.

The DBMS 220 provides a plug-in module interface definition language for describing interface specifications for the plug-in modules 327, 242-1. The definition registering mode 380 includes a plug-in module definition registering tool 382 which analyzes a plug-in module specification description 386 described in the plug-in module interface definition language and registers the plug-in module definition information 366 in the dictionary server 260 based on the analysis result.

Figure 2:
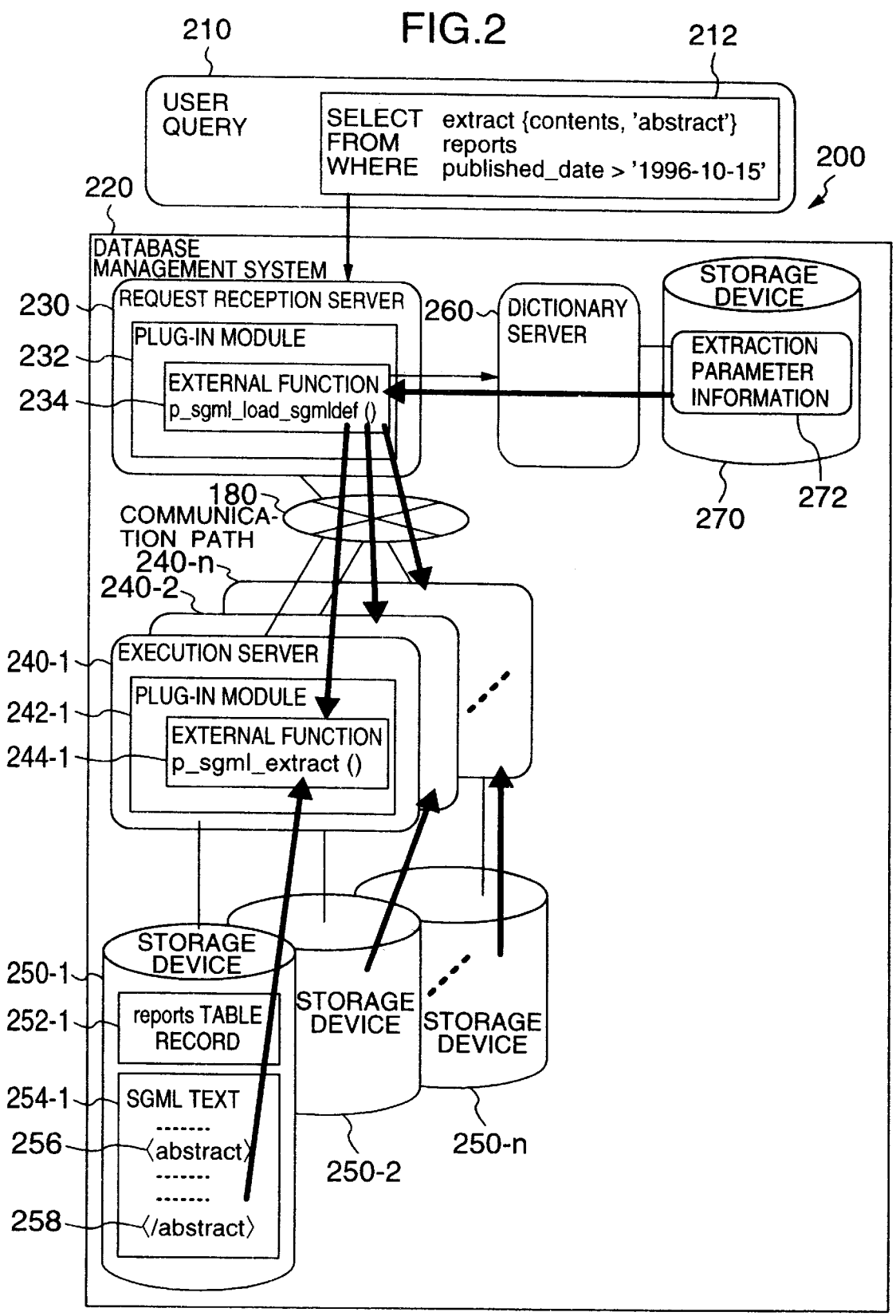
FIG. 2 is a schematic diagram illustrating the concept of the processing in an embodiment of a DB system to which the present invention is applied.
Figure 4:
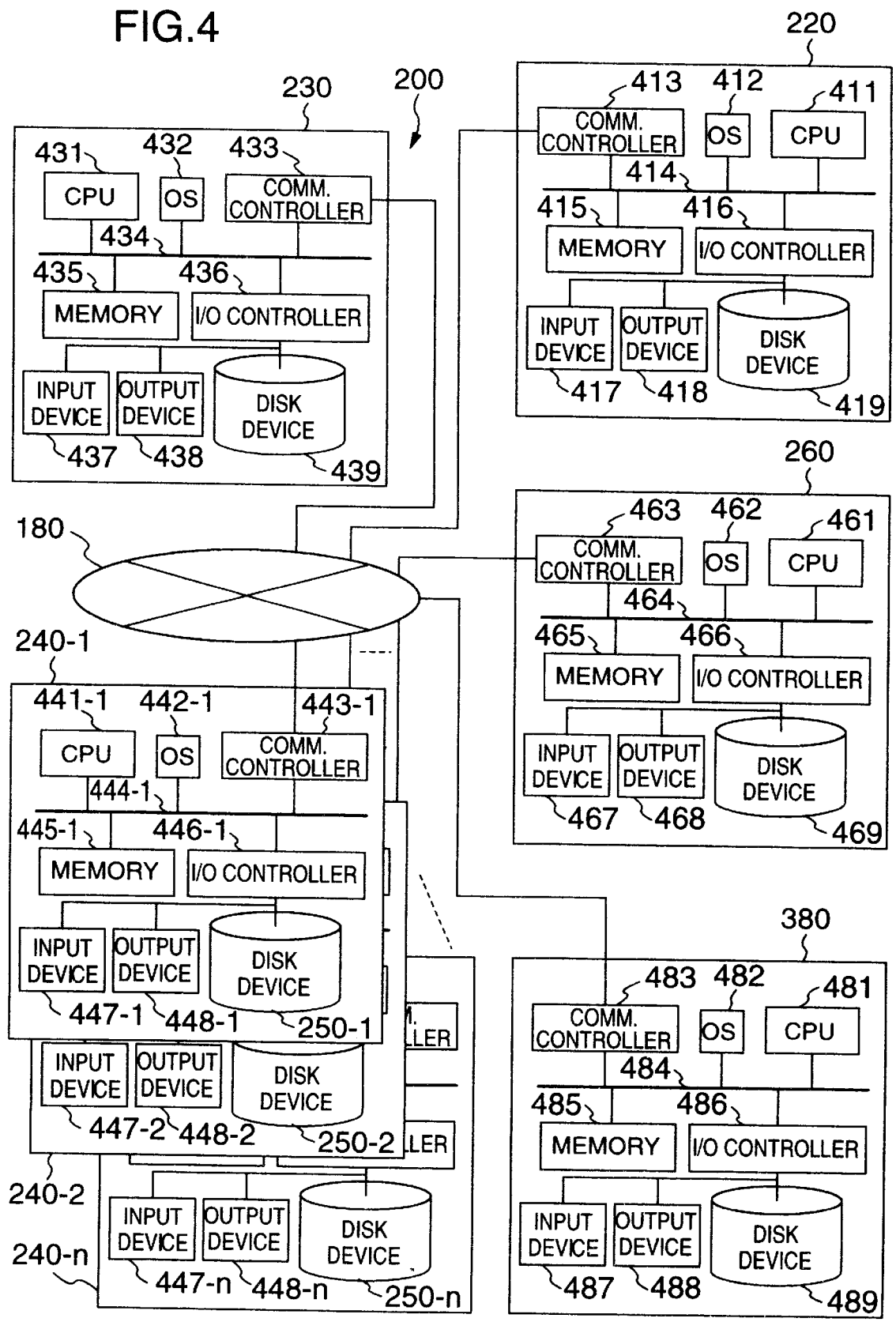
FIG. 4 is a block diagram illustrating a hardware configuration in the embodiment of the present invention shown in FIGS. 2 and 3.

FIG. 4 illustrates a hardware configuration in the embodiment of the present invention shown in FIGS. 2 and 3.

In FIG. 4, the DB system 200 has a plurality of computer nodes 220, 230, 240-1, 240-2, . . . , 240-n each comprising a general computer system, interconnected through a communication path 180 such as LAN (Local Area Network) or the like.

The computer node 220, which is a query requesting client having the function of the AP 210 in FIG. 3, comprises a configuration of a general computer, i.e., a CPU (Central Processing Unit) 411; an OS 412; a communication controller 413 connected to the communication path 180; a memory 415; an I/O controller 416; and a system bus 414 interconnecting these components. The I/O controller 416 is connected to an input device 417 such as a keyboard, a mouse or the like; an output device 418 such as a display, a printer or the like; and an external storage device 419 such as a disk device. The function of the AP 210 illustrated in FIG. 3 is realized by the CPU 411 which executes an appropriate program stored in the memory 415 under management of the OS 412.

Similarly, the computer node 230, which is the request reception server in FIG. 3, comprises a CPU 431; an OS 432; a communication controller 433 connected to the communication path 180; a memory 435; an I/O controller 436; a system bus 434 interconnecting these components; and an input device 437, an output device 438 and an external storage device 439 connected to the I/O controller 436. A variety of functions provided by the request reception server 230 illustrated in FIG. 3 are realized by the CPU 431 which executes appropriate programs stored in the memory 435 under management of the OS 432.

Also similarly, the computer nodes 240-1, 240-2, . . . , 240-n, 260 and 380 correspond to a plurality of the execution servers, the dictionary server and the definition registering server in FIG. 3, respectively, where the respective server functions illustrated in FIG. 3 are realized by respective CPUs which execute appropriate programs stored in associated memories under management of respective OSs.

Turning back to FIG. 3, the request reception server 230 acquires the extraction parameter information 272 prior to the executions of the execution servers 240-1, 240-2, . . . , 240-n, from the user defined function information 364 and the plug-in module definition information 366. The user defined function information 364 and the plug-in module definition information 366 are created and registered by the plug-in module definition registering tool 382 which analyzes the plug-in module specification description 386 in the definition registering server 380.

Description is now made on the processing for registering the plug-in module definition information 366 in the dictionary server 260. The user registers the plug-in module definition information 366 using the plug-in module definition registering tool 382 included in the DBMS 220.

Figures 5, 6:
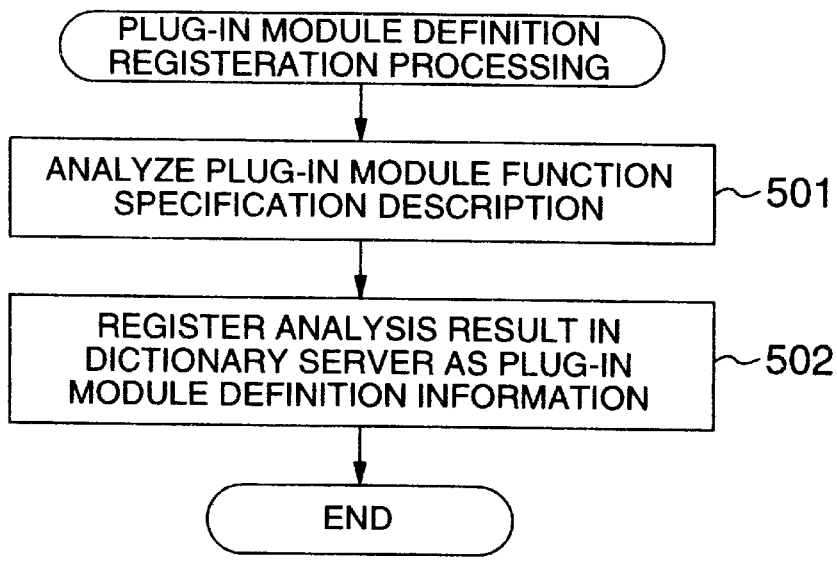
FIG. 5 is a flow chart representing the processing for registering a plug-in module definition in the embodiment of the present invention.
FIG. 6 is a description statement showing an example of a plug-in module specification description used in the embodiment of the present invention.

FIG. 5 is a flow chart representing the flow of processing executed by the plug-in module definition registering tool 382 to register the plug-in module definition information 366. An input to this processing is the plug-in module specification description 386, while an output is the plug-in module definition information 366 which is held in the dictionary server 260 as a result of this processing.

In FIG. 5, the plug-in module definition registering tool 382 first analyzes the plug-in module specification description 386 which is the input to the processing (step 501). An exemplary description of a plug-in module specification description described in the plug-in module interface definition language provided by the DBMS 220 is shown in FIG. 6.

FIG. 6 describes a function specification for registering the plug-in module definition information 366. Specifically, described herein is an interface specification for calling external functions p_sgml_extract( ) and p_sgml_load_sgmldef( ) from the DBMS 220. A key word returns on lines 604 and 607 in the plug-in module interface specification description is a modifier for a parameter which indicates that the associated parameter is used for returning a value. Also, by specifying the name of an external function following a key word setter on line 605, this line indicates that an associated parameter is involved in parameter bind, and that the request reception server 230 acquires a parameter value with the external function specified on this line 605.

By specifying a function modifier ADT_FUNCTION following a key word as on line 606, this line 606 indicates that an associated function is an external function corresponded to an ADT function. It should be noted herein that in the interface specification for the ADT function extract( ) used for a request from the user, the ADT function extract( ) is defined to take two inputs of ADT sgmltext_t type (line 602) and VARCHAR type (line 603), and in addition, the external function p_sgml_extract( ) is defined to take two inputs of BLOB type (lines 604, 605) other than these two inputs. This implies an input which is not included in a combination of inputs defined in an interface for calling a function of a plug-in module in response to a request from the user.

By specifying a function modifier BIND_PARAMETER following a key word as on line 609, this line 609 indicates that an associated function is an external function used for parameter bind.

According to the specifications written in the plug-in module interface definition language, definition information corresponding to the plug-in module definition information 366 can be described, and can be analyzed by the plug-in module definition registering tool 382.

Next, the plug-in module definition registering tool 382 registers the result of the analysis at step 501 in a dictionary 270 as the plug-in module definition information 366 using the definition information management unit 362 of the dictionary server 260 (step 502).

After executing step 502, the plug-in module definition registering tool 382 terminates this processing.

The processing of FIG. 5 will be described below in more specific manner.

First, the plug-in module definition registering tool 382 recognizes from the module specification description 386 that as ADT_FUNCTION is described on line 606 as a function modifier for the external function p_sgml_extract( ). Then, the plug-in module definition registering tool 382 interprets that the external function p_sgml_extract( ) supports the ADT function. In accordance with this interpretation, the external function name p_sgml_extract and a value indicative of "ADT function supportable" are registered in combination as a record 708 in an external function table 706 of FIG. 7.

Similarly, the plug-in module definition registering tool 382 recognizes that as BIND_PARAMETER is described on line 609 as a function modifier for the external function p_sgml_load_sgmldef( ), and interprets that the external function p_sgml_load_sgmldef( ) is a function which should be executed at the timing of parameter bind. Then, the external function name p_sgml_load_sgmldef and a value indicative of "parameter bind" are registered in combination as a record 709 in the external function table 706 of FIG. 7.

The plug-in module definition registering tool 382 also recognizes from line 602 of the module specification description 386 that a parameter of sgmltext_t type is described as a first parameter for the external function p_sgml_extract( ), and interprets that the first parameter for the external function p_sgml_extract( ) is a parameter of sgmltext_t type. It also interprets that there is no value corresponding to a parameter modifier. Then, the external function name p_sgml_extract( ), the parameter number "1," the parameter type sgmltext_t, and a value indicating that there is no value corresponding to a parameter modifier are registered in combination as a record 710 in the external function parameter table 707 of FIG. 7.

Similarly, for a second parameter, the external function name p_sgml_extract, the parameter number "2," the parameter type VARCHAR, and a value indicating that there is no value corresponding to a parameter modifier are registered in combination, based on the description on line 603, as a record 711 in the external function parameter table 707 of FIG. 7.

For a third parameter, the plug-in module definition registering tool 382 recognizes that returns is described on line 604 of the module specification description 386, and interprets that this parameter is used for returning the value of the external function p_sgml_extract( ). Then, the external function name p_sgml_extract, the parameter number "3," the parameter type BLOB, and a value indicating that the parameter modifier is "return" are registered in combination as a record 712 in the external function parameter table 707 of FIG. 7.

For a fourth parameter, the plug-in module definition registering tool 382 recognizes that setter('p_sgml_load_sgmldef') is described on line 605 of the module specification description 386, and interprets that this parameter is set to a value returned after executing the external function p_sgml_load_sgmldef( ) in parameter bind as an input parameter value. Then, the external function name p_sgml_load_sgmldef, the parameter number "4," the parameter type BLOB, and a value indicating that the external function used in the parameter bind is p_sgml_load_sgmldef( ) are registered in combination as a record 713 in the external function parameter table 707 of FIG. 7.

Similarly, for a first parameter for the external function p_sgml_load_sgmldef( ), the plug-in module definition registering tool 382 recognizes from line 607 of the module specification description 386 that a parameter of BLOB type is described as a first parameter for the external function p_sgml_load_sgmldef( ), and interprets that the first parameter for the external function p_sgml_load_sgmldef( ) is a parameter of BLOB type. The plug-in module definition registering tool 382 also recognizes that returns is described on line 607, and interprets that this first parameter is used for returning the value of the external function p_sgml_load_sgmldef( ). Then, the external function name p_sgml_load_sgmldef, the parameter number "1," the parameter type BLOB, and a value indicating that the parameter modifier is "return" are registered in combination as a record 714 in the external function parameter table 707 of FIG. 7.

For a second parameter for the external function p_sgml_load_sgmldef( ), the plug-in module definition registering tool 382 recognizes from line 608 of the module specification description 386 that a parameter of DBCOLUMNINFO type is described as a second parameter for the external function p_sgml_load_sgmldef( ), and interprets that the second parameter for the external function p_sgml_load_sgmldef( ) is a parameter of DBCOLUMNINFO type. It also interprets that there is no value corresponding to a parameter modifier. Then, the external function name p_sgml_load_sgmldef, the parameter number "2," the parameter type DBCOLUMNINFO, and a value indicating that there is no value corresponding to a parameter modifier are registered in combination as a record 715 in the external function parameter table 707 of FIG. 7B.

FIGS. 7A and 7B show exemplary structures of the user defined function information 364 and the plug-in module definition information 366. The information is managed by the definition information management unit 362, and referenced at step 902 of query analysis processing, later described.

The user defined function information 364 is managed by an ADT function—external function table 701 for holding the correspondence between ADT functions and external functions; and an ADT function parameter table 702 for holding structure information on ADT function parameters. The ADT function—external function table 701 has columns indicative of an ADT function name, an ADT type name and an external function name. The ADT function—external function table 701 may be readily created from a CREATE type sgmltext_t description statement. A record 703 in the ADT function—external function table 701 indicates that an ADT function extract( ) is an ADT function defined by ADT sgmltext_t, and is corresponded to an external function p_sgml_extract( ). By referencing the record 703, the query analysis unit 320 interprets that when the execution of the ADT function extract( ) is requested in a user query, the external function p_sgml_extract( ) must be called for executing the processing appropriate to the query.

The ADT function parameter table 702 has columns indicative of an ADT function name, a parameter number and a parameter type. A record 704 in the ADT function parameter table 702 indicates that the parameter type of a first parameter for the ADT function extract( ) is the sgmltext_t type. Assume herein that a parameter value passed by a first parameter for an ADT function is data of ADT type processed by the ADT function itself. A record 705 in the ADT function parameter table 702 indicates that a parameter type of a second parameter for the ADT function extract( ) is a VARCHAR type. This means that a parameter value passed by the second parameter for the ADT function extract( ) is the name of a tag which specifies an extracted portion. extract( ) extracts a portion of a SGML document 254-1 delimited by tags 256, 258 specified by this parameter.

By referencing the records 704 and 705, the query analysis unit 320 analyzes the two parameters of sgmltex_t type and VARCHAR type for the ADT function extract( ) in the user query. The plug-in module definition information 366 is managed by the external function table 706 for holding external functions included in a plug-in module and modification information related to the external functions, and the external parameter table 707 for holding information related to parameters for the external functions included in the plug-in module.

The external function table 706 has columns indicative of an external function name and a function modification. A record 708 in the external function table 706 holds an external function modifier "ADT function supportable" in the function modification column 708 to indicate that an external function p_sgml_extract( ) is an external function corresponded to an ADT function. A record 709 in the external function table 706 holds an external function modifier "parameter bind" in the function modification column 708 to indicate that an external function p_sgml_load_sgmldef( ) is an external function for performing parameter bind.

The external function parameter table 707 has columns indicative of an external function name, a parameter number, a parameter type and a parameter modification. A record 710 in the external function parameter table 707 indicates that a first parameter for the external function p_sgml_extract( ) passes a parameter value of sgmltext_t type. A record 711 in the external function parameter table 707 indicates that a second parameter for the external function p_sgml_extract( ) passes a parameter value of the VARCHAR type. By referencing the records 703, 704 and 705, the query analysis unit 320 interprets that the first parameter and the second parameter for the external function p_sgml_extract( ) pass parameter values for the first parameter and the second parameter for the ADT function as they are, from the information indicating that the external function p_sgml_extract( ) is corresponded to the ADT function extract( ). A record 712 in the external function parameter table 707 holds "return" as a parameter modifier in the parameter modification column to indicate that a third parameter for the external function p_sgml_extract( ) passes a parameter value of BLOB type as a return value of this function. A record 713 in the external function parameter table 707 indicates that a fourth parameter for the external function p_sgml_extract( ) passes a parameter value of BLOB type. Also, the record 713 holds "parameter bind p_sgml_load_sgmldef" as a parameter modifier in the parameter modification column to indicate that the parameter bind is performed by the external function p_sgml_load_sgmldef( ), i.e., that a value returned by the external function p_sgml_load_sgmldef( ) is used as a parameter value for the fourth parameter.

A record 714 in the external function parameter table 707 holds "return" as a parameter modifier in the parameter modification column to indicate that a first parameter for the external function p_sgml_load_sgmldef( ) passes a parameter value of BLOB type as a return value of this function. A record 715 in the external function parameter table 707 indicates that a second parameter for the external function p_sgml_load_sgmldef( ) passes a parameter value of DBCOLUMNINFO type. The DBCOLUMINFO type is a data type provided by the DBMS 220 for representing definition information related to a column. When the DBCOLUMINFO type is specified for the parameter type, the query processing control unit 329 processes to pass definition information on a column to be processed as the parameter value. Functionally, the external function p_sgml_extract( ) is a function for extracting a portion specified by tags with an extraction parameter used as an input.

In the following, an example of the extraction parameter 272 is shown:

DTD:extract.dtd (12)

highlight:strong (13)

This example includes an indication on line (12) that when a character string of an extracted portion is processed into single SGML document data, the SGML document data is created in accordance with a document type definition (DTD) identified by a file name extract.dtd , and an indication on line (13) that when any extraction condition, for example, a section containing a key word (e.g., "patent") is selected as an extraction object, a tag labelled strong is used to emphasize and output a key word portion of a document that satisfies the condition.

The external function p_sgml_load_sgmldef( ) is a function for acquiring a table name and a column name from column information of DBCLUMATINFO type, and accessing the dictionary server 362 to retrieve the extraction parameter 272.

The user of the DB system registers the extraction parameter in the dictionary server in correspondence to column information, where the ADT sgmltext-t tye is specified as a column type.

By referencing the records 703, 708 and 710, the query analysis unit 320 interprets that the external function p_sgml_extract( ) is executed by the execution servers 240-1, 240-2, . . . , 240-n. This interpretation is based on an idea that for handling ADT type data using an ADT function, the parallel processing function can be effectively utilized when an execution server storing the data executes the ADT function. Also, by referencing the record 709, the query analysis unit 320 interprets that the external function p_sgml_load_sgmldef( ) is executed by the request reception server 230 since the external function p_sgml_load_sgmldef( ) is an external function for performing the parameter bind.

Figure 1:
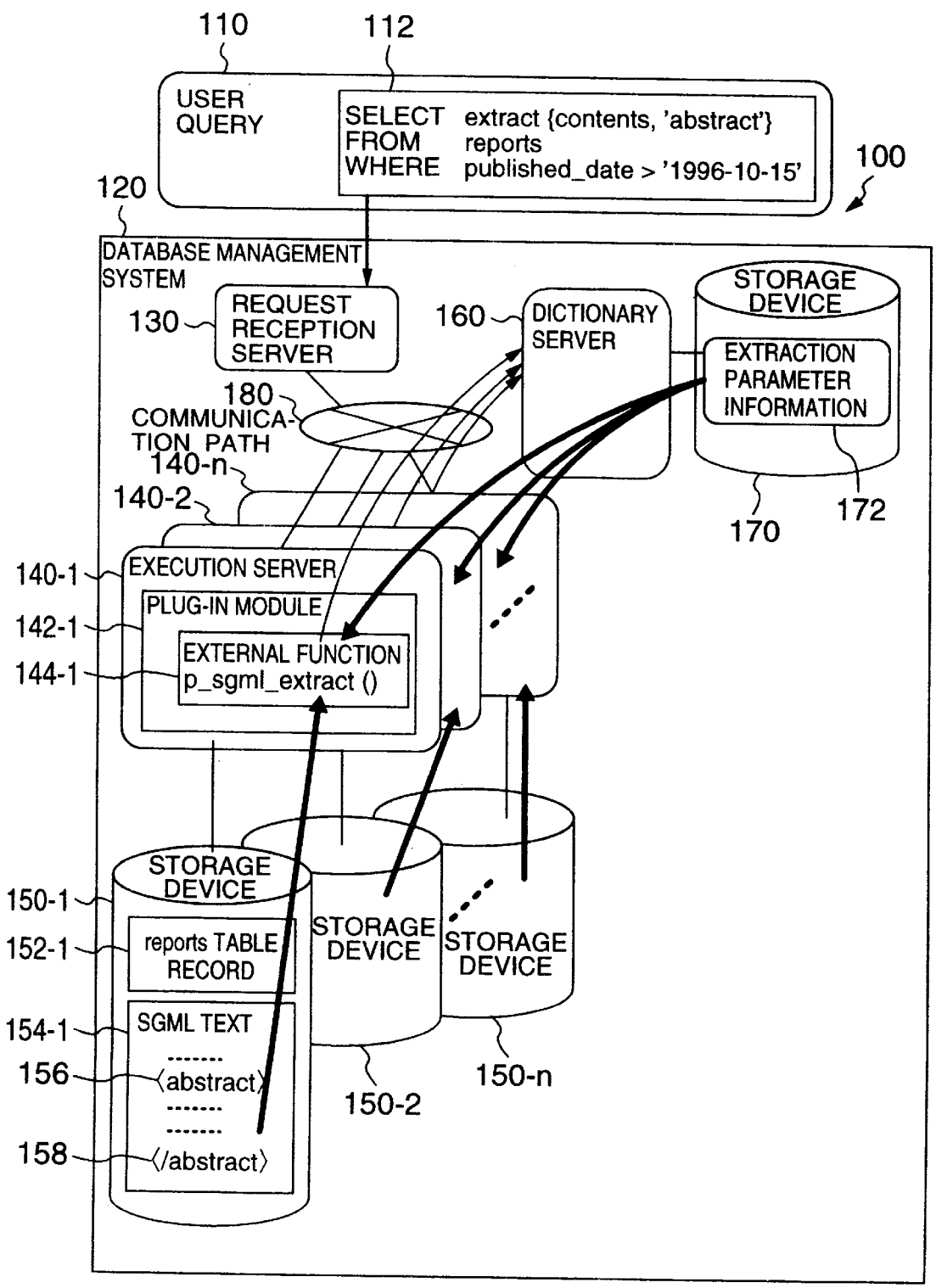
FIG. 1 is a schematic diagram illustrating the concept of the processing in a conventional DB system.

FIG. 2 is a schematic diagram illustrating how the query request processing is executed in the DB system 200 according to the present invention in comparison with the DB system 100 shown in FIG. 1.

The DB system of FIG. 2 executes database processing in response to a user query 210 in the following manner.

First, the request reception server 230 receives a user query 210 (description statement 212 written in SQL 3). The request reception server 230 calls an external function p_sgml_load_sgmldef( ) 234 included in a plug-in module 232 in parameter bind processing (at step 1201 in FIG. 12, later described). The external function p_sgml_load_sgmldef( ) 234 requests the dictionary server 260 to acquire the extraction parameter information 272 and returns the extraction parameter information 272 as a return value. The request reception server 230 holds the return value from the external function p_sgml_load_sgmldef( ) 234 as run-time input information (322 in FIG. 3). The request reception server 230 requests the plurality of execution servers 240-1, 240-2, . . . , 240-n to execute processing appropriate to the user query 210 in an execution request to the execution servers in execution instruction processing (step 803 in FIG. 8, later described). With this request, the run-time input information 322 including the extraction parameter information 272 is transmitted to the plurality of execution servers 240-1. 240-2, . . . , 240-n. Each of the execution servers 240-1, 240-2, . . . , 240-n calls an external function p_sgml_extract 244-1 included in a plug-in module 242-1 in accordance with an execution procedure code 343 received in the execution request. In this event, the external function p_sgml_extract( ) 244-1 executes the processing using the parameters as input information containing the extraction parameter information 272. With such database processing, the plug-in module 232 is executed in the parameter bind processing in the request reception server 230. As the request reception server 230 has executed the plug-in module 232 only once to previously acquire the extraction parameter information 272, each of the execution servers 240-1, 240-2, . . . , 240-n can use the extraction parameter information 272 acquired by the request reception server 230 in its execution of the plug-in module 242-1 without individually requesting the extraction parameter information 272 to the dictionary server 260. It is therefore appreciated that the problem of concentrated loads on the dictionary server 160 can be solved in the database system illustrated in FIG. 1.

Figure 8:
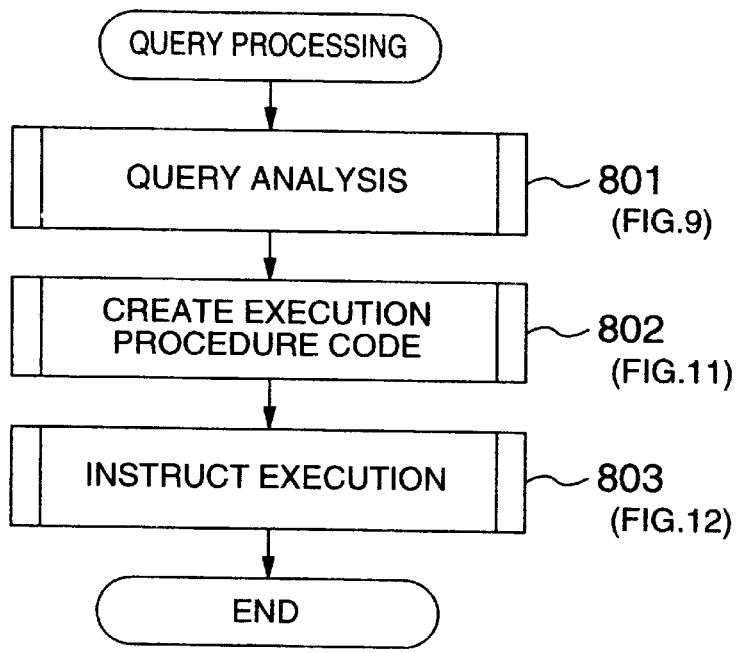
FIG. 8 is a flow chart representing the processing executed by a query processing control unit in the embodiment of the present invention illustrated in FIG. 3.

FIG. 8 is a flow chart representing the flow of processing executed by the query processing control unit 329 in response to a query request from the AP 310. An input to this processing is the user query 210, while an output is execution result which is held in the execution result holding unit 328 as a result of this processing. First, the query processing control unit 329 analyzes the query, which is an input to the processing, using the query analysis unit 320 (step 801). An execution procedure code pattern selection result is acquired as a result of this analysis. Details of the processing at step 801 will be described later with reference to FIG. 9. Next, the query processing control unit 329 creates an execution procedure code 321 using the execution procedure code creation unit 324 based on the execution procedure code pattern selection result acquired at step 801 (step 802). Details of the processing at step 802 will be described later with reference to FIG. 11.

Next, the query processing control unit 329 instructs the execution servers 240-1, 240-2, . . . , 240-n to execute processing appropriate to the user's request using the execution instruction unit 325 based on the execution procedure code acquired at step 802 (step 803). Each of the execution servers 240-1, 240-2, . . . , 240-n, upon receiving the instruction, transmits the processing result to the execution result holding unit 328 of the request reception server 230. Details of the processing at step 803 will be described later with reference to FIG. 12. After executing step 803, the query processing control unit 329 terminates this processing.

Figure 9:
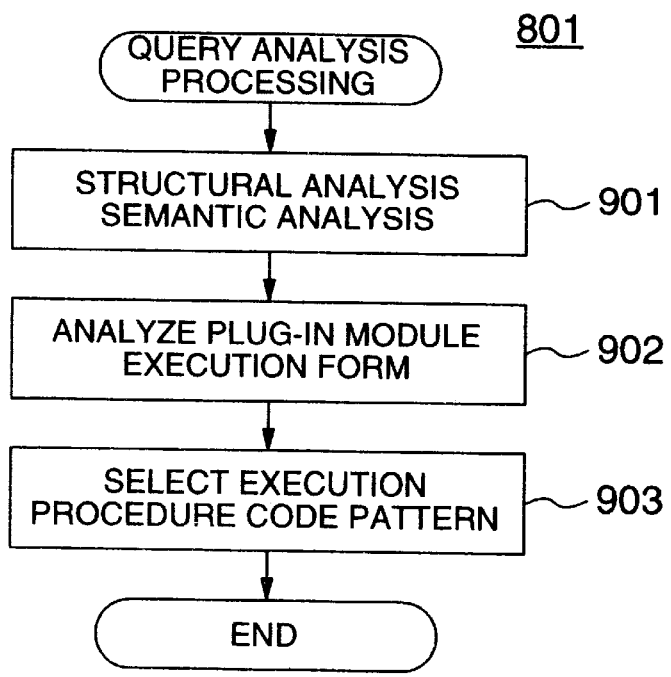
FIG. 9 is a flow chart representing the processing executed by a query analysis unit in the embodiment of the present invention illustrated in FIG. 3.

FIG. 9 is a flow chart representing the flow of processing executed by the query analysis unit 320 to analyze a query 210 transmitted from the AP 310 to the request reception server 230. A user query is inputted to this processing, while an execution procedure code pattern selection result and a parameter bind instruction information list are outputted as a result of this processing. First, the query analysis unit 320 performs a structural analysis and a semantic analysis on the user query (step 901). The processing at step 901 may be based on general approaches for SQL structural analysis and semantic analysis to extend it to such a form as to support descriptions of SQL3. At step 901, the query analysis unit 320 analyzes whether or not an ADT function is called in the user's query, and which type of data is to be handled. Next, the query analysis unit 320 accesses the definition information management unit 362 of the dictionary server 260 based on the result of the analysis made at step 901, and examines a correspondence between ADT functions and external functions to analyze an execution form of a plug-in module 242 (step 902). The analysis result serves as a reference when an execution procedure pattern is selected. Information for calling the plug-in module 232 has already been described in connection with FIG. 7. Next, the query analysis unit 320 selects an execution procedure pattern for the DB processing appropriate to the user's request based on the analysis result at step 902, and produces an execution procedure code pattern selection result (step 903). The execution procedure code pattern will be described later with reference to FIG. 10. After executing step 903, the query analysis unit 320 terminates the query analysis processing.

Figure 10:
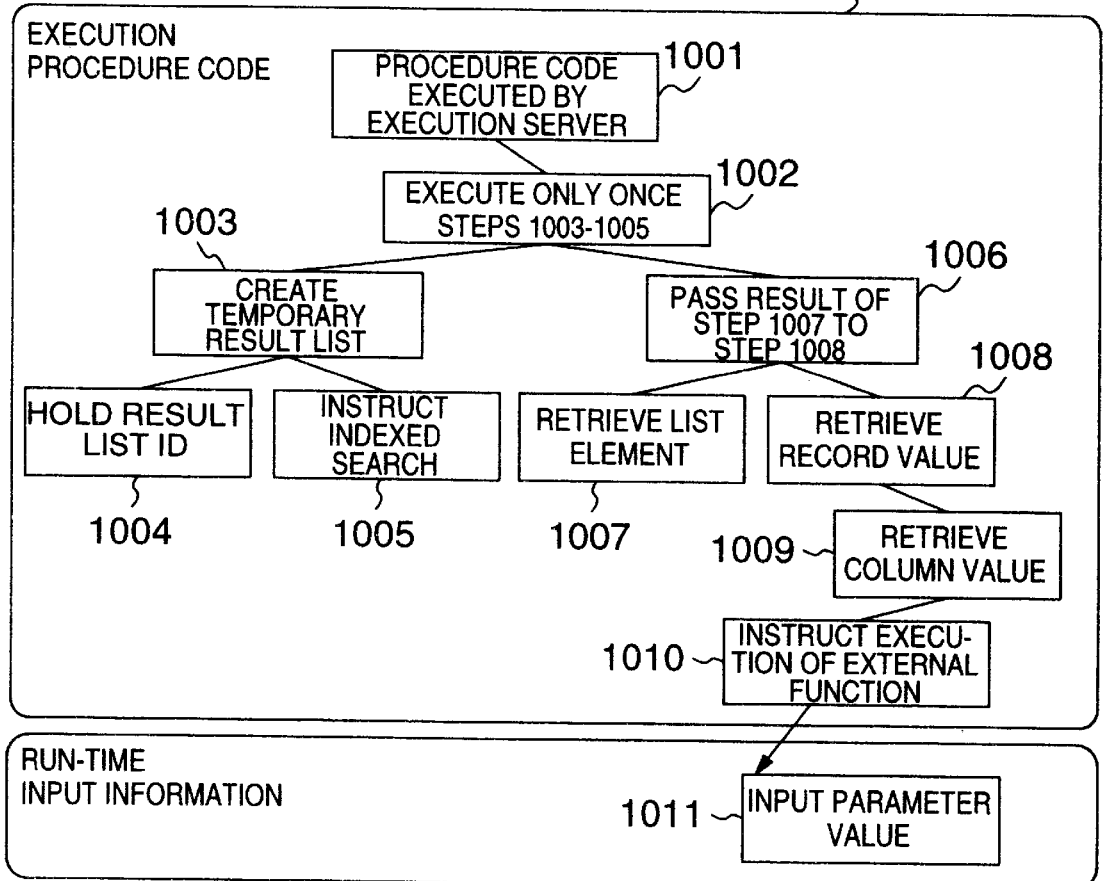
FIG. 10 is a tree structure diagram illustrating an example of an execution procedure code in the embodiment of the present invention.

FIG. 10 illustrates a structure of an execution procedure code pattern. This execution procedure code is a procedure for the processing which corresponds to the following query 212 described as SQL3 statements:
SELECTION extract(contents, 'abstract')
FROM reports
WHERE published_date>'1996-10-15'
The execution procedure code pattern is represented by a tree structure having, as its elements, a plurality of processing nodes which instruct a control of an associated execution. Such a pattern in tree structure is selected in the query analysis processing (step 903 in FIG. 9).

A processing node 1001 holds, as information describing the node itself, a value indicating that "the execution procedure code is a code executed by an execution server." The node 1001 also holds a pointer to a processing node indicative of execution contents, which pointer points to a node 1002. The node 1002 holds, as information describing the node itself, a value indicating that "a lower left node is executed only once and subsequently only a lower right node is executed."

A node 1003 located at a lower left position from the node 1002 holds, as information describing the node itself, a value indicating that "a temporary processing result list is produced." A lower left node from the node 1003 is a node 1004 which holds a list ID for identifying the temporary processing result list in the node 1003.

A node 1005 located at a lower right position from the node 1003 indicates that "a search is performed utilizing an index" and also indicates that "the search result is provided as the temporary processing result list in the node 1003."

The illustrated execution procedure code instructs to search for records satisfying a condition published_date>'1996-10-15' using an index set in a column published_date of reports. Then, as a result of the indexed search, a set of record IDs of records in reports satisfying the condition are provided as a temporary processing result list.

A node 1006 located at a lower right position from the node 1002 indicates that "the processing result of the lower left node is passed to the lower right node."

A node 1007 located at a lower left position from the node 1006 indicates that "an element is retrieved from the temporary processing result list in the processing in accordance with the execution procedure code." Here, the node 1007 instructs the retrieval of the record IDs included in the index search result.

A node 1008 located at a lower right position from the node 1006 indicates that "values (records) passed from the node 1006 are retrieved from a database file." Here, the node 1008 instructs the retrieval of records in reports.

A node 1009, which is a lower node of the node 1008, indicates that "the node 1008 retrieves a portion of values (records) retrieved from a database file." Here, the node 1009 instructs the retrieval of values held in the column contents of the records in reports, i.e., SGML texts.

A node 1010, which is a lower node of the node 1009, indicates that "an external function is executed for the values retrieved in the node 1009." Here, the node 1010 instructs the execution of an external function p_sgml_extract( ) for SGML texts held in the column contents. It should be noted that the node 1010 holds a pointer to an input parameter value 1011 held in the execution work area as an input to be used when executing the external function p_sgml_extract( ). Here, the extraction parameter 272, which has been set by the parameter bind of the request reception server 230, is pointed to as input information. The parameter bind and the setting of the pointer will be described later with reference to FIGS. 12 and 13.

As described above, the execution procedure code illustrated in FIG. 10 represents an execution procedure of sequentially executing the external function p_sgml_extract( ) for elements in a set of temporary processing results retrieved by the indexed search. This does indicate a procedure of the processing appropriate to the user's query or request.

Figure 11:
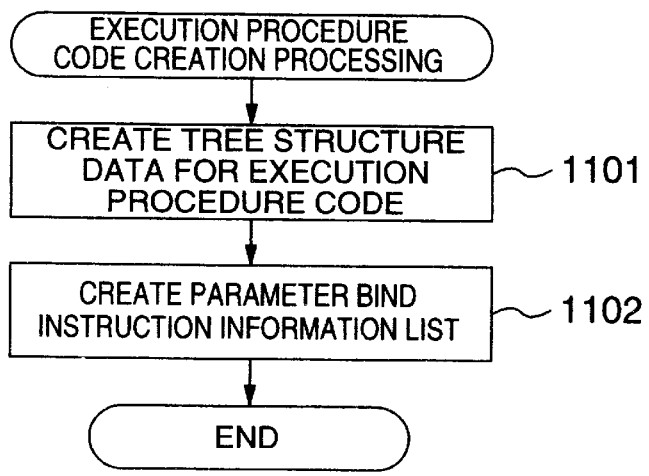
FIG. 11 is a flow chart representing the processing executed by an execution procedure code creation unit in the embodiment of the present invention illustrated in FIG. 3.

FIG. 11 is a flow chart representing the flow of processing executed by the execution procedure code creation unit 324 to produce an execution procedure code 321. An input to this processing is the execution procedure code pattern selection result outputted from the query analysis unit 320, while an execution procedure code and a parameter bind instruction information list are outputted as a result of the processing.

The execution procedure code creation unit 324 first creates a node tree structure data, which serves as the basis of an execution procedure code, from the execution procedure code pattern selection result which is the input to this processing (step 1101). This processing may only need to create an equivalent to general control information indicative of an execution procedure for the DB processing. The tree created at step 1101 includes nodes which may instruct an external function call.

The execution procedure code creation unit 324 next creates a parameter bind instruction information list for instructing the execution of parameter bind (step 1102). First, the execution procedure code creation unit 324 searches for a node which instructs an external function call, and searches for parameters associated with the external function, when such a node instructing an external function call is found, to confirm whether or no the parameter bind has been specified in the external function. If the parameter bind has been specified, the execution procedure code creation unit 324 creates instruction information for executing the parameter bind based on the definition information related to the parameter bind.

For example, as previously described in connection with FIG. 10, the node tree structure data created at step 1101 is searched for the node 1001 for calling the external function p_sgml_extract( ). Then, as previously described in connection with FIG. 7, the execution procedure code creation unit 324 interprets that the external function p_sgml_load_sgmldef( ) must be executed to perform the parameter bind as an input to the fourth parameter when calling the external function p_sgml_extract( ).

For example, the execution procedure code creation unit 324 references the record 713 in the external function parameter table 707 of FIG. 7, and interprets that the external function p_sgml_load_sgmldef( ) is used in the parameter bind. Then, the execution procedure code creation unit 324 references the records 714, 715 in the external function parameter table 707, interprets parameters for executing the external function p_sgml_load_sgmldef( ), and adds the parameters to the parameter bind instruction information.

Based on the foregoing information, the execution procedure code creation unit 324 can create parameter bind instruction information which instructs to "set a return value produced by executing the external function p_sgml_load_sgmldef( ) to the fourth parameter input for the external function executed by node 1001." If plural sets of such parameter bind instruction information exist for an execution procedure code, they are managed in the form of a list, and a parameter bind instruction information list is created.

Figure 12:
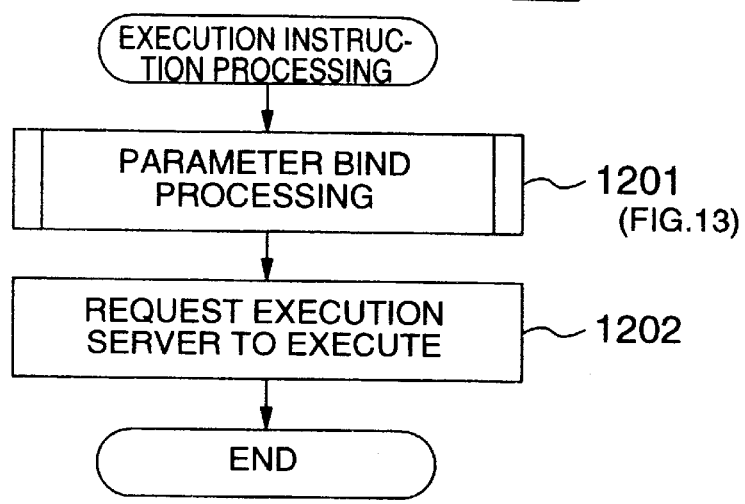
FIG. 12 is a flow chart representing the processing executed by an execution instruction unit in the embodiment of the present invention illustrated in FIG. 3.

FIG. 12 is a flow chart representing the flow of processing executed by the execution instruction unit 325 to instruct the execution servers 240-1, 240-2, . . . , 240-n to initiate their execution. Inputs to this processing are the execution procedure code 321 created by the execution procedure code creation unit 324 and a parameter bind instruction information list, while an output is an execution result which is held in the execution result holding unit 328 as a result of the processing.

The execution instruction unit 325 first executes the parameter bind using the parameter bind control unit 326 based on the execution procedure code and the parameter bind instruction information list which are the inputs to this processing (step 1201). The execution of the parameter bind using the parameter bind control unit will be described later with reference to FIG. 13.

The execution instruction unit 325 next instructs the execution servers 240-1, 240-2, . . . , 240-n to initiate the execution of processing based on the execution procedure code 321 with which the parameter bind has been performed at step 1201 (step 1202). At step 1202, the plurality of execution servers 240-1, 240-2, . . . , 240-n are respectively instructed to parallelly execute the processing appropriate to the user's request. Also, at step 1202, when instructing the execution servers to execute the processing, information stored in the execution work area 323 of the request reception server 230 is transmitted as it is to the execution work area 340 of each execution server. The execution servers 240-1, 240-2, . . . , 240-n directly transmit the respective processing results produced thereby to the execution result holding unit 328 of the request reception server 230 through the communication path 180. By the processing described above, the processing results in the respective execution servers are held in the execution result holding unit 328 of the request reception server 230.

Figure 13:
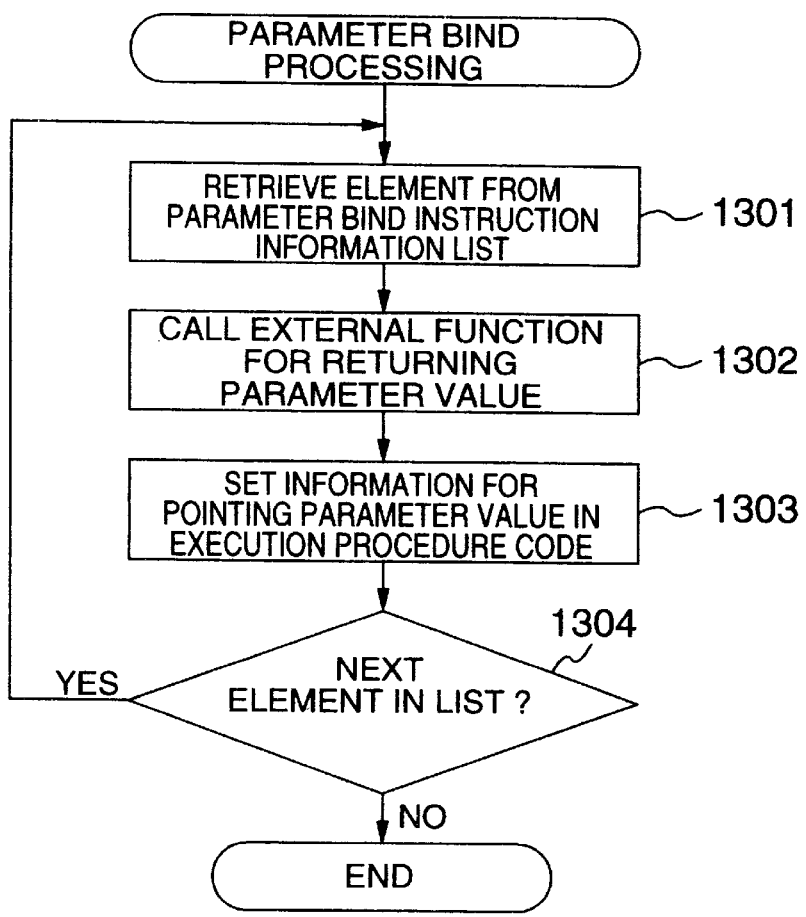
FIG. 13 is a flow chart representing the processing in a parameter bind control unit in the embodiment of the present invention illustrated in FIG. 3.

FIG. 13 is a flow chart representing the flow of the processing executed by the parameter bind control unit 326 to execute the parameter bind. This processing receives, as an input, the parameter bind instruction information list created by the execution procedure code creation unit 324, executes the parameter bind, and sets a pointer to an input parameter to the execution procedure code as a result of the processing.

The parameter bind control unit 326 first extracts an element from the parameter bind instruction information list which is the input to this processing (step 1301). Next, the parameter bind control unit 326 executes an external function which returns a parameter value based on the parameter bind instruction information extracted at step 1301 (step 1302). Here, the external function p_sgml_load_sgmldef( ) is executed to acquire the extraction parameter 272 from the dictionary server 260.

The parameter bind control unit 326 next copies the return value of the external function provided at step 1302 to the execution work area 323 as run-time input information 322. The parameter bind control unit 326 next sets information in the execution procedure code in accordance with the instruction of the parameter bind instruction information such that this run-time input information is pointed to as a parameter value (step 1303). Then, the parameter bind control unit 326 checks whether or not a next element exists in the parameter bind instruction information list which is the input to this processing (step 1304). If the next element exists at step 1304, the flow returns to step 1301 to continue the processing. Conversely, if the next element does not exist at step 1304, this processing is terminated.

With the processing and the data structure described above, an external function included in a plug-in module can be called from the request reception server to perform the parameter bind, and an external function included in a plug-in module can be called from the execution server with a parameter value acquired by the parameter bind used as an input.

Programs for realizing the invention are stored in storage medium such as floppy disks, CD-ROMs, DAT and the like.

What is claimed is:

1. A method of performing, using a data processing program for processing data, database processing by transferring an input query to said data processing program, comprising the steps of:

analyzing said query containing a call of said data processing program;

deciding whether said data is to be transferred to said data processing program based on a result of said analyzing step;

referring to data structure information held for reference of said data and generating data to be transferred to said data processing program, when said result of said analyzing step indicates that data should be transferred; and transferring said data thus generated and data processing instructions based on said query to said data processing program.

2. A method according to claim 1, further comprising the step of:

packaging said data processing instructions and said generated data in one packet and transferring said package to said data processing program.

3. A method according to claim 1, wherein said data processing program performs data processing by activating a plug-in module;

wherein an interface specification definition specifying interface of said plug-in module includes instructions indicating that said generated data is transferred to said data processing program; and wherein said method further comprises the steps of:
transferring said generated data to said data processing program on the basis of said instructions,
activating, by said data processing program, said plug-in module on the basis of said interface specification definition, and
performing, by said plug-in module, data processing by referring said generated data.

4. A method according to claim 3, wherein said plug-in module is comprised of a function for providing a data processing operation;

wherein said function has a parameter of data input;

wherein said interface specification definition includes specification of said function and said parameter of data input; and wherein said method further comprises the steps:
analyzing said query input containing a call of said data processing program,
selecting said function corresponding to said call of said data processing program by referring to said interface specification definition based on a result of said analyzing step,
setting said generated data to said parameter,
calling, by said data processing program, said function thus selected, and
transferring said generated data to the parameter of said function.

5. A method according to claim 1, wherein said method performs processing of document data;

wherein said call of said data processing program contained in said input query is a call of a function of partial extraction of said document data; and wherein said data transferred to said data processing program is data indicating structural information of document data to be outputted as a result of partial extraction of said document data.

6. A database processing system, having a data processing program for processing data, for performing data processing by transferring an input query to said data processing program, comprising:

an analyzing unit which analyzes said query containing a call of said data processing program;

a data generating unit which decides whether said data is to be transferred to said data processing program based on a result of the analyzing by said analyzing unit, refers to data structure information held for reference of said data, and generates data to be transferred to said data processing program, when said result of the analyzing by said analyzing unit indicates that said data should be transferred; and an interface unit which transfers said data thus generated and data processing instructions based on said query to said data processing program.

7. A database program stored on a computer readable storage medium for performing, using a data processing program for processing data, database processing by transferring an input query to said data processing program, said database program when executed causes a computer to perform the steps of:

analyzing said query containing a call of said data processing program;

deciding whether said data is to be transferred to said data processing program based on a result of said analyzing step;

referring to data structure information held for reference of said data and generating data to be transferred to said data processing program, when said result of said analyzing step indicates that said data should be transferred; and transferring said data thus generated and data processing instructions based on said query to said data processing program.

8. A database program stored on a computer readable storage medium for performing, using a data processing program for processing data, database processing by transferring an input query to said data processing program, said database program being executed by a computer comprising:

analyzing code which analyzes said query containing a call of said data processing program;

deciding code which decides whether said data is to be transferred to said data processing program based on a result of said analyzing code;

referring code which refers to data structure information held for reference of said data and generates data to be transferred to said data processing program, when said result of said analyzing code indicates that said data should be transferred; and transferring code which transfers said data thus generated and data processing instructions based on said query to said data processing program.

* * * * *